United States Patent [19]

Wilson et al.

[11] Patent Number: 5,605,411
[45] Date of Patent: Feb. 25, 1997

[54] LOCK FOR CYLINDRICAL ROD

[75] Inventors: Jerry L. Wilson, 570 NE. 53rd Ave., Hillsboro, Oreg. 97124; Richard A. Edinger, Hillsboro, Oreg.

[73] Assignee: Jerry L. Wilson, Hillsboro, Oreg.

[21] Appl. No.: 514,598

[22] Filed: Aug. 14, 1995

[51] Int. Cl.⁶ .................................................. F16B 2/18
[52] U.S. Cl. ........................ 403/325; 403/324; 403/109; 482/107
[58] Field of Search .................................. 403/108, 109, 403/321, 322, 324, 325, 377, 378, 24; 482/106, 107, 108

[56] References Cited

U.S. PATENT DOCUMENTS

| | | | |
|---|---|---|---|
| 808,706 | 1/1906 | Villedrouin | 482/108 |
| 1,645,457 | 10/1927 | Schall | 482/107 |
| 2,662,712 | 12/1953 | Rose | 403/108 X |
| 4,577,837 | 3/1986 | Berg et al. | 403/108 X |
| 4,639,979 | 2/1987 | Polson | 482/107 |
| 4,893,810 | 1/1990 | Lee | 482/107 |
| 4,927,286 | 5/1990 | Hobluigie et al. | 403/325 X |
| 4,955,603 | 9/1990 | Becker | 482/107 |
| 5,062,631 | 11/1991 | Dau et al. | 482/107 |
| 5,295,933 | 3/1994 | Ciminski et al. | 482/107 |

FOREIGN PATENT DOCUMENTS

| | | | |
|---|---|---|---|
| 3738360 | 11/1987 | Germany | 482/107 |
| 1618430 | 1/1991 | U.S.S.R. | 482/108 |
| 1766430 | 10/1992 | U.S.S.R. | 482/107 |

*Primary Examiner*—Harry C. Kim
*Attorney, Agent, or Firm*—Chernoff, Vilhauer, McClung & Stenzel

[57] ABSTRACT

A lock, which releasably affixes to the end of a cylindrical rod, includes a torus-like case having a central cylindrical passageway that fits over the rod. A spring normally urges a pair of cylindrical pistons located in the case to a locked position where they partially extend into the passageway by a spring. An actuation mechanism allows the pistons to be moved to an unlocked position where they are completely contained within the case by pressing a plunger that extends through the case. The rod contains a plurality of pairs of openings at specified locations along the rod that receive the pistons when the lock is placed on the rod.

11 Claims, 3 Drawing Sheets

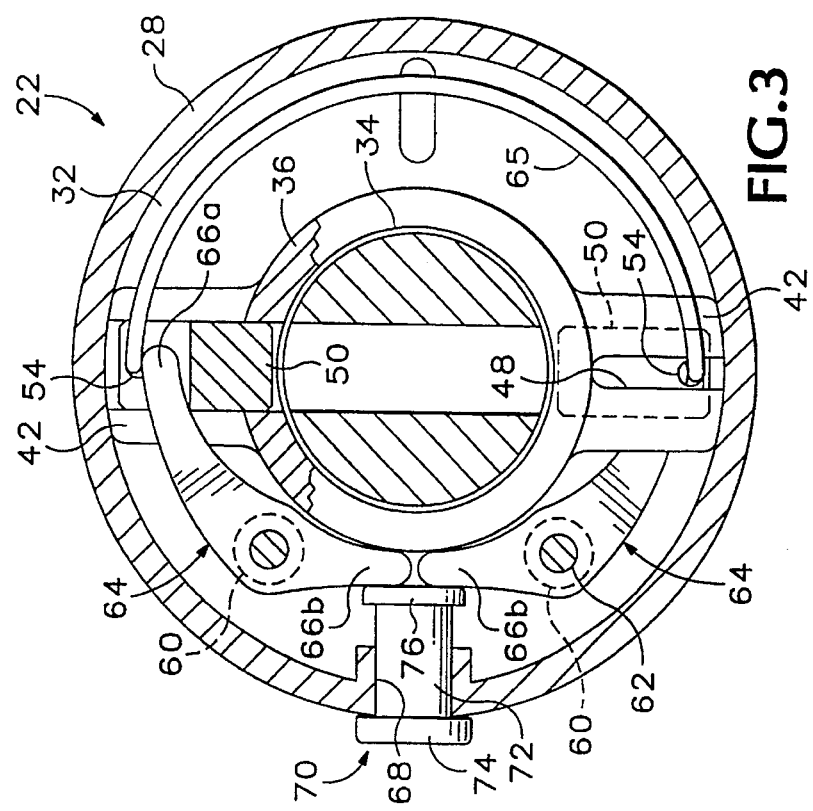
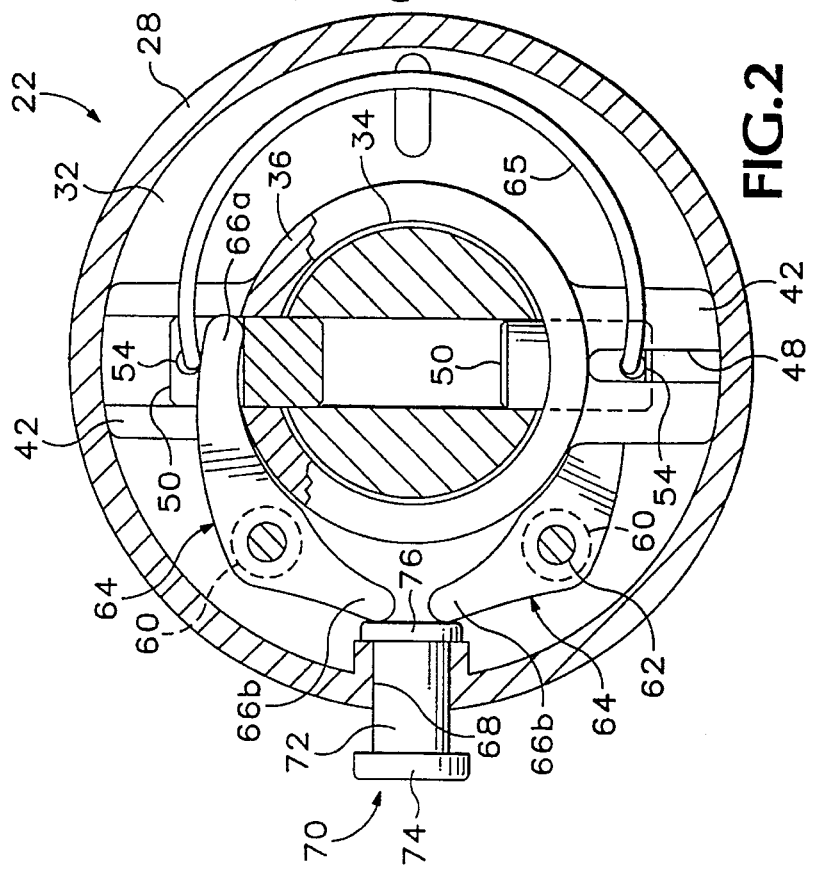

LOCK FOR CYLINDRICAL ROD

BACKGROUND AND SUMMARY OF THE INVENTION

The subject invention relates to a quick release lock mechanism for securing objects on a cylindrical rod, and in particular, for securing weights on dumbbells, Many devices utilize a cylindrical rod to carry one or more elements where it is necessary to secure the elements on the rod at selected locations. One such application is dumbbells where a plurality of weights placed on the opposite ends of a bar are held in place by locks that are affixed to the ends of the bar. These locks are continually being removed and reinstalled in order to change the weights carried on the bar and, thereby, increase or decrease the overall weight of the dumbbell.

Dumbbell locks typically use a set screw of some type to attach the lock to the bar. Set screws not only make it difficult to quickly change weights, if they are not properly tightened the lock may be forced off of the rod by the weights when the dumbbell is in use.

The subject invention overcomes the foregoing shortcomings and limitations of the prior art dumbbell locks by providing a torus-like case which has a cylindrical passageway extending through it that receives the rod the lock will be affixed to. Located in the case is one or more pistons which are moveable between an unlocked position where they are located completely in the case and a locked position where they project out of the case into the passageway. The rod has holes arranged to receive the pistons when they are in the locked position. These holes are placed at a number of desired locations along the length of the rod. An actuation mechanism located in the case facilitates movement of the pistons between their locked and unlocked positions.

In a preferred embodiment of the invention, a spring urges the pistons toward their locked positions and rotation of a pair of levers, that are pivotally mounted in the case, moves the pistons to their unlocked positions. The levers are rotated by pushing a plunger that extends through the case.

In the preferred embodiment, the pistons fit in bosses that are located in the case. The pistons and bosses have aligned slots which receive one end of the associated lever. Holes in the pistons extend through the slots and receive tabs located at the ends of the spring and to hold the ends of the lever in the slots in the pistons.

Accordingly, the lock can be quickly and easily removed and replaced to facilitate changing weights carried by the dumbbell.

The foregoing and other objectives, features, and advantages of the invention will be more readily understood upon consideration of the following detailed description of the invention, taken in conjunction with the accompanying drawings.

BRIEF DESCRIPTION OF THE DRAWINGS

FIGS. 2 and 3 are cross-sectional views of the lock in its locked and released positions, respectively.

DETAILS OF THE PREFERRED EMBODIMENT

Figure 1:
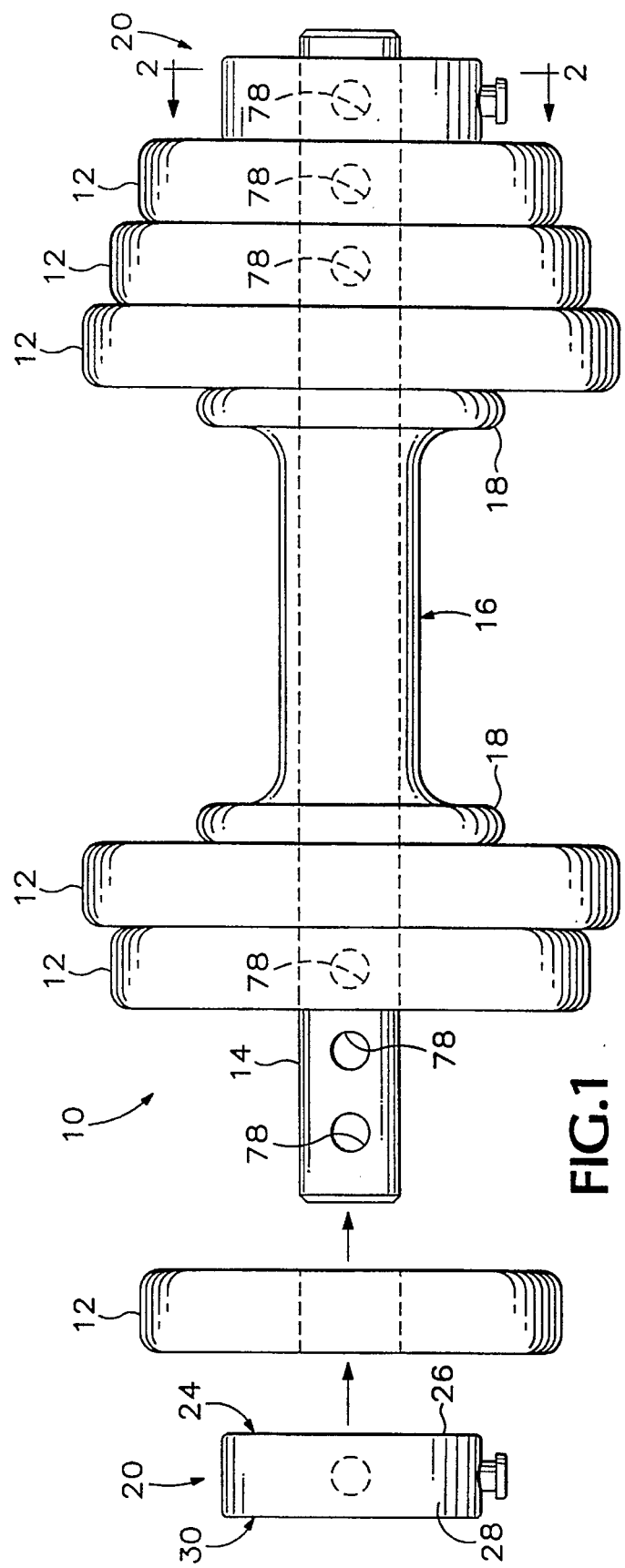
FIG. 1 is a partially exploded side elevation view showing a dumbbell utilizing the lock of the subject invention.
Figure 4:
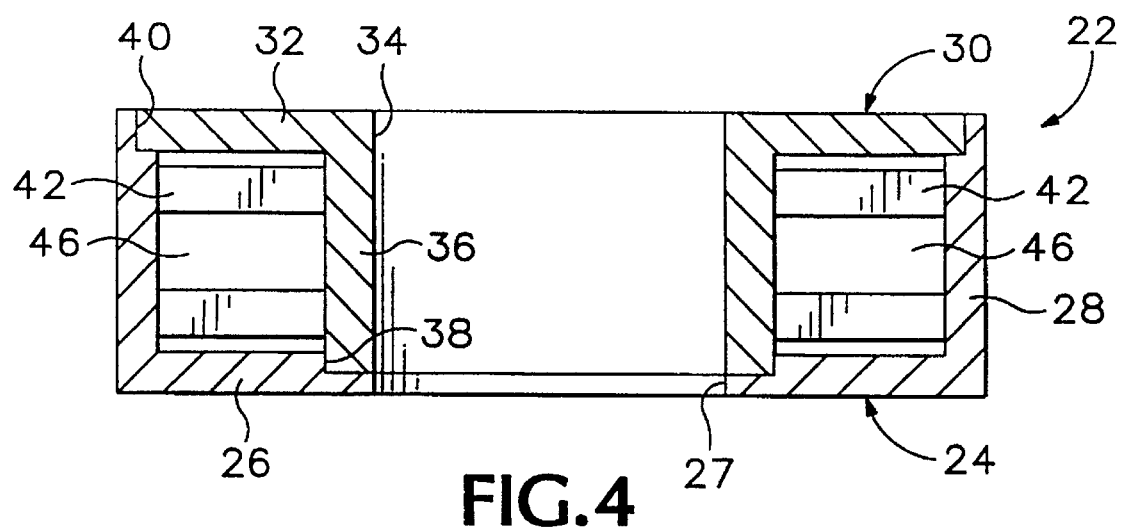
FIG. 4 is a sectional view showing the case that encloses a lock.

There are many situations where it is necessary to place a lock on a cylindrical rod to prevent an object being carried on the rod from sliding off of its end. These devices preferably have a quick release mechanism to facilitate the removal of the carried object from the rod. Referring to FIG. 1 of the drawings, such a situation is a dumbbell 10 where weights 12 are placed on each end of a bar 14. A hand grip 16, which fits over the bar, has flanges 18 at each end which prevent the weights from moving past a certain point toward the center of the bar. The subject lock 20 is affixed to the ends of the bar to hold the weights on the bar snugly against the flanges.

Referring now also to FIGS. 2–5, the locks include a two-piece plastic case 22. The case body 24 comprises a flat circular plate 26 with a circular hole 27 formed in its center having a diameter that will slidably receive the rod. An upstanding wall 28 extends around the periphery of the plate 26. The case lid 30 comprises a slightly smaller diameter flat circular plate 32, with a like-sized circular hole 34 at its center and an upstanding hollow cylindrical tube 36 circumscribing the hole 34. The tube 36 has a height such that when the lid 30 is inserted into the body 24 the tube fits in a counterbore 38 in the plate and the plate 32 fits into a recess 40 formed at the edge of the wall 28. When assembled the case comprises a hollow torus-like tube having a rectangular cross-section and a cylindrical passageway that slidably fits over the rod 14.

Figure 5:
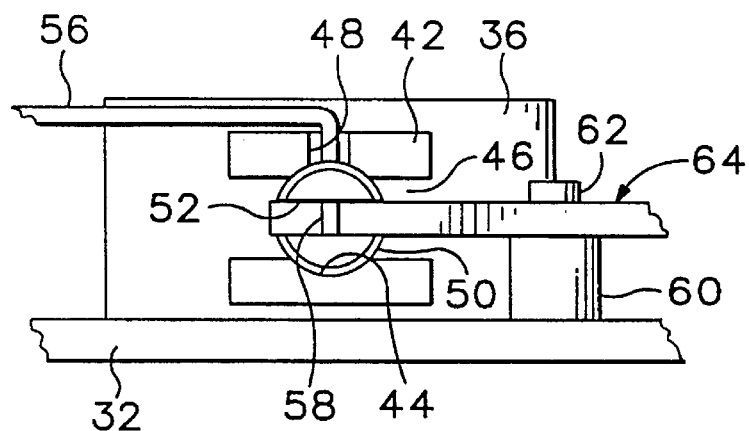
FIG. 5 is a sectional view showing the details of the lock actuation mechanism.

Referring now also to FIG. 5, located in the lid 30 are opposed rectangular cross-sectioned bosses 42 that extend between the tube 36 and a wall 28 of the case body 24. A bore 44 extends through each boss and the tube 36 and each boss has a first slot 46 that extends laterally through the center of the bore and a second slot 48 that extends between the bore and the top of the boss.

Slidably located in each boss is a cylindrical piston 50. The piston 50 has a length which is less than the length of the bore 44 so that it is moveable between an unlocked position where it is entirely contained within the case (FIG. 3) and a locked position where it projects through the tube 36 (FIG. 2). The piston has a lateral slot 52 in the end facing away from the tube 36 and a hole 54, that extends through the piston, intersects the slot. A C-shaped spring 56 having tabs 58 at each end which fit through the holes 54 in the opposed pistons 50, urges the pistons to their locked positions.

Raised posts 60 are located on the plate 32 next to each boss 42. A pin 62 extends outwardly from each post. A lever 64, having angularly offset legs, has a bore 66 intermediate its ends which rotatably fits over the pin 62. A first leg 66a of each lever fits into the slot 52 in one of the pistons 50, and a second leg 66b terminates a space distance apart from the other second leg midway between the bosses 42. The first legs 66a of the levers have a width equal to the distance between the bottoms of the slots 52 and the holes 54. Thus, when the tabs 58 of the springs 56 are inserted into the holes 54, the first legs are held in place by the tabs. As a result, when the second legs 66b of the levers are pushed toward the tube 66, the levers are rotated about the pin 62 and the first legs 66a move the pistons against the spring 56 to their unlocked positions. When the second legs are released, the spring forces the piston back to their locked positions.

The wall 28 of the body 24 has an opening 68 passing through it which slidably contains a plunger 70. The plunger has a cylindrical body 72 that fits within the opening 68. Located at the end of the body 72 that is on the outside of the wall 28 is a larger diameter head 74. Located at the other end of the plunger is a larger diameter cam 76 which is configured to engage the second legs 66b of the lever 64 and push them toward the tube 36 when the plunger is depressed.

The case body has first raised ledges (not shown) on its plate 26 which have holes that receive the pins 62 when the case lid is placed on the case body.

When the case lid is inserted into the case body a rectangularly cross-sectioned torus-like body having a central cylindrical opening which slidably fits over a dumbbell bar 62 is created. The pistons extend into the cylindrical opening under normal circumstances, however, by depressing the plunger 70 the pistons can be withdrawn into the case.

In order to be used with the lock of the subject invention, the dumbbell bar 14 must have a series of holes 78 located on each of its ends. The holes are sized to receive the pistons 50 when the locks are placed on the bar. The innermost holes are located longitudinally on the bar such that when a single weight is located on each end of the dumbbell and the pistons 50 inserted into the innermost hole, the locks will clamp the weights against the flanges 18. The remaining holes are located at successive multiples of the thickness of the weights outwardly of the innermost holes.

The lock permits quick and easy installation and removal of weights by pressing the plunger 70 and sliding the lock onto or off of the rod 14. In addition, positive locking always occurs and weights cannot inadvertently come off of the dumbbell due to failure to adequately tighten the lock.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. An assembly comprising:

at least one pair of weight plates having cylindrical holes defined centrally therein;

a cylindrical rod that slidably receives said weight plates with one of said weight plates being disposed on each end of said cylindrical rod;

a handgrip which fits on said cylindrical rod, said handgrip having stops which keep the weight plates at said each end of said rod separated from one another by a pre-determined distance;

a pair of locks wherein each lock being releasibly attachable to said each end of said rod, said each lock including:

a case having a cylindrical passageway extending therethrough that slidably receives said cylindrical rod;

at least one piston movable between an unlocked position where the piston is located within said case and a locked position where the piston projects partially into said cylindrical passageway;

an actuator for moving said piston between the locked and unlocked positions;

wherein said cylindrical rod has at least one hole defined therein proximate said each end thereof for receiving said piston when said piston is in the locked position, such that said lock holds the respective weight plate in place against said stop.

2. The assembly of claim 1, wherein there are two diametrically opposed pistons.

3. The assembly of claim 2, wherein said actuator comprises:

a spring which normally urges said pistons to said locked position; and a plunger which extends through said case and facilitates movement of said pistons to said unlocked position.

4. The assembly of claim 3, wherein said actuator further comprises a pair of rotatably mounted levers, said levers having first ends which are attached to said pistons and second ends which are engaged by said plunger.

5. The assembly of claim 4, wherein said case has a central tube which defines said cylindrical passageway.

6. The assembly of claim 5, wherein said case includes a pair of bosses having bores defined therein that receive said pistons.

7. The assembly of claim 6, wherein said pistons and said bosses have aligned slots which receive the first ends of said levers.

8. The assembly of claim 7, wherein said pistons have holes extending therethrough which intersect said slots, and said spring has tips which fit into said holes of the pistons to secure said first ends of said levers in said slots in said pistons.

9. The assembly of claim 1, wherein said cylindrical rod has multiple holes at said each end, said holes being spaced apart from one another such that said each lock can hold a varying number of the weight plates against said stop.

10. A lock assembly comprising:

an elongate cylindrical rod;

a case having a cylindrical passageway extending therethrough that slidably receives said cylindrical rod, said case having a central tube which defines said cylindrical passageway and a pair of bosses having bores defined therein;

two diametrically opposed pistons slidably movable in said bores of the bosses between an unlocked position where the pistons are located completely within said case and a locked position where the pistons project partially into said cylindrically passageway;

an actuator for moving said pistons between the locked and unlocked positions; wherein said actuator including:

a spring which normally urges said pistons into said locked position;

a plunger which extends through said case and facilitates movement of said pistons to said unlocked position;

a pair of rotatably mounted levers, said levers having first ends which are attached to said pistons and second ends which are engaged by said plunger;

said pistons and said bosses having aligned slots which receive the first ends of said levers;

wherein said cylindrical rod has at least one hole defined therein for receiving said pistons when said pistons are in said locked position.

11. The lock assembly of claim 10, wherein said pistons have holes extending therethrough which intersect said slots, and said spring has tips which fit into said holes to secure said first ends of said levers in said slots in said pistons.

* * * * *

UNITED STATES PATENT AND TRADEMARK OFFICE
CERTIFICATE OF CORRECTION

PATENT NO. : 5,605,411
DATED : February 25, 1997
INVENTOR(S) : Jerry L. Wilson; Richard A. Edinger It is certified that error appears in the above-indentified patent and that said Letters Patent is hereby corrected as shown below:

Column 1, Line 10:  Delete "," after dumbbells and insert --.--

Column 3, Line 15:  Delete "62" and insert --14--

Signed and Sealed this

Fifth Day of August, 1997

Attest:

BRUCE LEHMAN

Attesting Officer

Commissioner of Patents and Trademarks